US011422781B1

(12) United States Patent
Neuendorffer et al.

(10) Patent No.: US 11,422,781 B1
(45) Date of Patent: Aug. 23, 2022

(54) GENERATION OF VECTOR CODES FOR TENSOR CONVOLUTIONS

(71) Applicant: Xilinx, Inc., San Jose, CA (US)

(72) Inventors: Stephen A. Neuendorffer, San Jose, CA (US); Prasanth Chatarasi, Atlanta, GA (US); Samuel R. Bayliss, Mountain View, CA (US)

(73) Assignee: XILINX, INC., San Jose, CA (US)

( * ) Notice: Subject to any disclaimer, the term of this patent is extended or adjusted under 35 U.S.C. 154(b) by 298 days.

(21) Appl. No.: 16/781,323

(22) Filed: Feb. 4, 2020

(51) Int. Cl.
G06F 8/41 (2018.01)
G06F 9/30 (2018.01)
G06F 7/57 (2006.01)
G06F 7/483 (2006.01)
G06F 7/544 (2006.01)

(52) U.S. Cl.
CPC .............. *G06F 8/443* (2013.01); *G06F 7/483* (2013.01); *G06F 7/5443* (2013.01); *G06F 7/57* (2013.01); *G06F 9/3001* (2013.01)

(58) Field of Classification Search
CPC .......... G06F 7/483; G06F 7/5443; G06F 7/57; G06F 9/3001
See application file for complete search history.

(56) References Cited

U.S. PATENT DOCUMENTS

2020/0134417 A1* 4/2020 Mohapatra .............. G06F 15/80
2021/0312270 A1* 10/2021 Liguori ..................... G06F 7/50

OTHER PUBLICATIONS

White Paper, "Xilinx AI Engines and Their Applications", XILINX, Inc., WP506 (v1.0.2) Oct. 3, 2018.

* cited by examiner

*Primary Examiner* — Michael D. Yaary
(74) *Attorney, Agent, or Firm* — Crawford Maunu PLLC

(57) ABSTRACT

Disclosed approaches for generating vector codes include inputting tensor processing statements. Each statement specifies an output variable, an initial variable, and multiply-and-accumulate (MAC) operations, and each MAC operation references the output variable, elements of a first tensor, and one or more elements of a second tensor. The MAC operations are organized into groups, and the MAC operations in each group reference the same output variable and have overlapping references to elements of the first tensor. For each group of MAC operations, at least one instruction is generated to load elements of the first tensor into a first register and at least one instruction is generated to load one or more elements of the second tensor into a second register. For each group of MAC operations, instructions are generated to select for each MAC operation in the group for input to an array of MAC circuits, elements from the first register and one or more elements from the second register.

20 Claims, 12 Drawing Sheets

FIG. 3

```
For(yloop)
    For(xloop)
        For(rloop)
            For(sloop)
                O[y][x] += W[s][r] * I[y+s][x+r]
``` example of initial HLL specification
302

FIG. 4

| Statement | Output  | Initial Load | MACs            |
|-----------|---------|--------------|-----------------|
| S0        | O[0][0:7] | O[0][0:7]  | I[0][0:7] * W[0:0] |
| S1        | O[0][0:7] | O[0][0:7]  | I[0][1:8] * W[1:1] |
| S2        | O[0][0:7] | O[0][0:7]  | I[0][2:9] * W[2:2] |
| S3        | O[0][0:7] | O[0][0:7]  | I[1][0:7] * W[3:3] |
| S4        | O[0][0:7] | O[0][0:7]  | I[1][1:8] * W[4:4] |
| S5        | O[0][0:7] | O[0][0:7]  | I[1][2:9] * W[5:5] |
| S6        | O[0][0:7] | O[0][0:7]  | I[2][0:7] * W[6:6] |
| S7        | O[0][0:7] | O[0][0:7]  | I[2][1:8] * W[7:7] |
| S8        | O[0][0:7] | O[0][0:7]  | I[2][2:9] * W[8:8] | example of triplet specification
for 0 ≤ y ≤ 2
0 ≤ x ≤ 9
304

FIG. 5

```
For(Y-loop)
    For(X-loop)
        S0: V1 = VLOAD(I, 0:7);
            V2 = VBROADCAST(W, 0:0);
            V3 = VLOAD(O, 0:7)
            V4 = VMAC(V1, V2);
            V5 = VADD(V3, V4);
            VSTORE(O, 0:7, V5);
            ...
``` example of non-optimized intermediate specification
306

| Fused Statement | Output | Initial Load | Group of MACs |
|---|---|---|---|
| FS0 | O[0][0:7] | O[0][0:7] | I[0][0:7] * W[0:0]<br>I[0][1:8] * W[1:1]<br>I[0][2:9] * W[2:2]<br>I[1][0:7] * W[3:3]<br>I[1][1:8] * W[4:4]<br>I[1][2:9] * W[5:5]<br>I[2][0:7] * W[6:6]<br>I[2][1:8] * W[7:7]<br>I[2][2:9] * W[8:8] | example of fused statement 308

FIG. 6

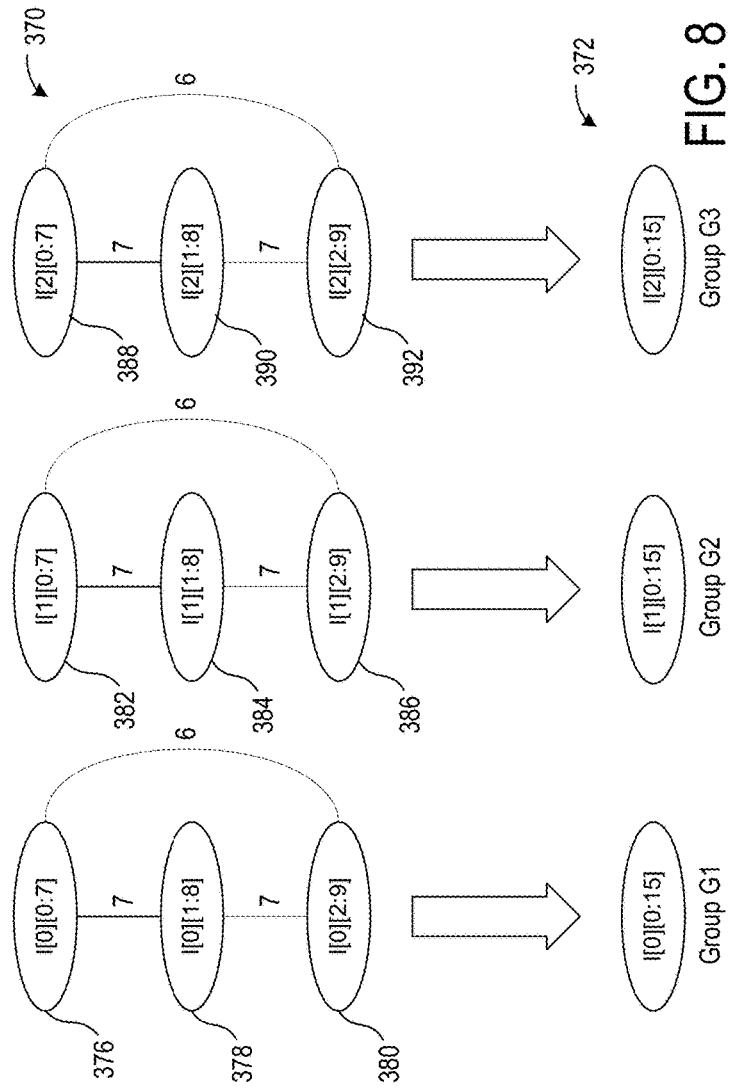
FIG. 7
FIG. 8
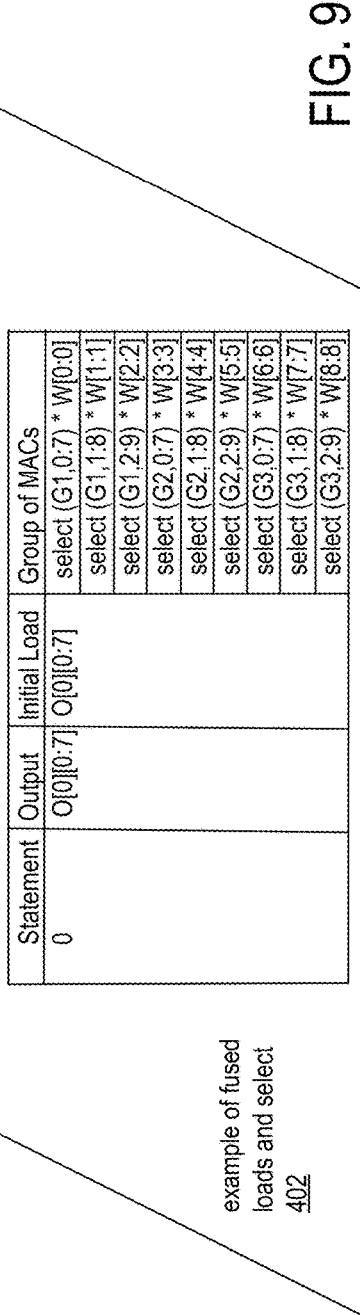
FIG. 9

| Statement | Output | Initial Load | Group of MACs |
|---|---|---|---|
| FS0 | O[0][0:7] | O[0][0:7] | select (G1,0:7) * select(G4, 0:0) |
| | | | select (G1,1:8) * select(G4, 1:1) |
| | | | select (G1,2:9) * select(G4, 2:2) |
| | | | select (G2,0:7) * select(G4, 3:3) |
| | | | select (G2,1:8) * select(G4, 4:4) |
| | | | select (G2,2:9) * select(G4, 5:5) |
| | | | select (G3,0:7) * select(G4, 6:6) |
| | | | select (G3,1:8) * select(G4, 7:7) |
| | | | select (G3,2:9) * select(G5, 0:0) | example of fused vector and scalar loads 460

FIG. 11

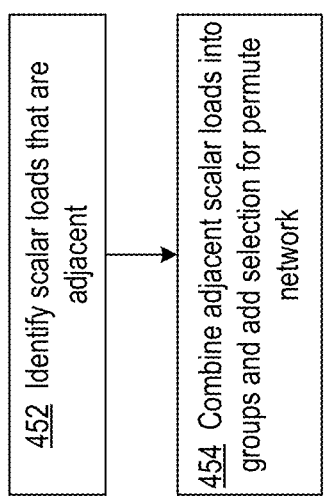

452 Identify scalar loads that are adjacent

454 Combine adjacent scalar loads into groups and add selection for permute network

FIG. 10 example optimized
specification
508

G1 → VLOAD(I, 0:15)
G4 → VLOAD(W, 0:7)
MUL1; MAC2; MAC3;
G2 → VLOAD(I,272:287)
MAC4; MAC5; MAC6;
G3 → VLOAD(I,544:559)
MAC7; MAC8;
G5 → VLOAD(W,8:15)
MAC9;

| Statement | Output | Initial Load | Group of MACs | instruction | VLIW-directed operations of MAC array | | | | | | | | | |
|---|---|---|---|---|---|---|---|---|---|---|---|---|---|---|
| 0 | O[0][0:7] | O[0][0:7] | select (G1,0:7) * select(G4, 0:0) | MUL1 | $I_{0,0}*W_0$ | $I_{0,1}*W_0$ | $I_{0,2}*W_0$ | $I_{0,3}*W_0$ | $I_{0,4}*W_0$ | $I_{0,5}*W_0$ | $I_{0,6}*W_0$ | $I_{0,7}*W_0$ | | |
| | | | select (G1,1:8) * select(G4, 1:1) | MAC2 | $+I_{0,1}*W_1$ | $+I_{0,2}*W_1$ | $+I_{0,3}*W_1$ | $+I_{0,4}*W_1$ | $+I_{0,5}*W_1$ | $+I_{0,6}*W_1$ | $+I_{0,7}*W_1$ | $+I_{0,8}*W_1$ | | |
| | | | select (G1,2:9) * select(G4, 2:2) | MAC3 | $+I_{0,2}*W_2$ | $+I_{0,3}*W_2$ | $+I_{0,4}*W_2$ | $+I_{0,5}*W_2$ | $+I_{0,6}*W_2$ | $+I_{0,7}*W_2$ | $+I_{0,8}*W_2$ | $+I_{0,9}*W_2$ | | |
| | | | select (G2,0:7) * select(G4, 3:3) | MAC4 | $+I_{0,0}*W_3$ | $+I_{0,1}*W_3$ | $+I_{0,2}*W_3$ | $+I_{0,3}*W_3$ | $+I_{0,4}*W_3$ | $+I_{0,5}*W_3$ | $+I_{0,6}*W_3$ | $+I_{0,7}*W_3$ | | |
| | | | select (G2,1:8) * select(G4, 4:4) | MAC5 | $+I_{0,1}*W_4$ | $+I_{0,2}*W_4$ | $+I_{0,3}*W_4$ | $+I_{0,4}*W_4$ | $+I_{0,5}*W_4$ | $+I_{0,6}*W_4$ | $+I_{0,7}*W_4$ | $+I_{0,8}*W_4$ | | |
| | | | select (G2,2:9) * select(G4, 5:5) | MAC6 | $+I_{0,2}*W_5$ | $+I_{0,3}*W_5$ | $+I_{0,4}*W_5$ | $+I_{0,5}*W_5$ | $+I_{0,6}*W_5$ | $+I_{0,7}*W_5$ | $+I_{0,8}*W_5$ | $+I_{0,9}*W_5$ | | |
| | | | select (G3,0:7) * select(G4, 6:6) | MAC7 | $+I_{0,0}*W_6$ | $+I_{0,1}*W_6$ | $+I_{0,2}*W_6$ | $+I_{0,3}*W_6$ | $+I_{0,4}*W_6$ | $+I_{0,5}*W_6$ | $+I_{0,6}*W_6$ | $+I_{0,7}*W_6$ | | |
| | | | select (G3,1:8) * select(G4, 7:7) | MAC8 | $+I_{0,1}*W_7$ | $+I_{0,2}*W_7$ | $+I_{0,3}*W_7$ | $+I_{0,4}*W_7$ | $+I_{0,5}*W_7$ | $+I_{0,6}*W_7$ | $+I_{0,7}*W_7$ | $+I_{0,8}*W_7$ | | |
| | | | select (G3,2:9) * select(G5, 0:0) | MAC9 | $+I_{0,2}*W_8$ | $+I_{0,3}*W_8$ | $+I_{0,4}*W_8$ | $+I_{0,5}*W_8$ | $+I_{0,6}*W_8$ | $+I_{0,7}*W_8$ | $+I_{0,8}*W_8$ | $+I_{0,9}*W_8$ | | |

FIG. 15

GENERATION OF VECTOR CODES FOR TENSOR CONVOLUTIONS

TECHNICAL FIELD

The disclosure generally relates to compiling convolution program code.

BACKGROUND

Convolutional neural networks provide a popular and effective way of developing a variety of machine learning applications. In these networks, convolution operations dominate other operations as a proportion of the overall compute workload.

Some products, such as the Versal AI Engine from Xilinx, Inc., are designed to provide higher throughput/energy than an equivalent implementation in field programmable gate array (FPGA) logic. AI Engines have been optimized for compute-intensive applications, specifically digital signal processing (DSP) and some artificial intelligence (AI) technology such as machine learning (ML) and 5G Wireless applications. Each core of the AI Engine array can process a very long instruction word (VLIW), which allows issuing of load, store, and/or compute operations in parallel. Each core has an array of vector hardware for performing numerous computations in a single cycle. Each core also has a permute unit for selection of vector elements, which eliminates the need for register-to-register data shuffling operations which are expensive, yet common in other architectures.

Applications involving the Versal AI Engine invoke intrinsic functions to express computations in groups of multiply-and-accumulate (MAC) operations that are tailored to the architecture. For example, programming the Versal AI Engine using 8-bit intrinsic functions requires splitting an application into groups of 128 MAC operations, where 128 is the number of MAC operations performed in one cycle through the issuing of a single MAC instruction. Programs of this type are not portable and not easily understood, and performance can be less than optimal.

In many cases, developers specifically program each core in order to take full advantage of the architectural features. However, each feature can have various restrictions, which makes preparing efficient and correct code difficult. For example, the permute unit allows flexible reordering of the data in the path from vector registers to the MAC array. However, the multiplexers in the permute unit make selections in response to a small number of constants encoded in the instruction, and the encoding of constants has many restrictions. In addition, it is infeasible for a programmer to explore the space of possible optimizations for convolutions manually, because the possible solution space numbers in billions.

SUMMARY

A disclosed method includes inputting by a computer processor a first plurality of statements. Each statement specifies an output variable, an initial variable, and a plurality of multiply-and-accumulate (MAC) operations, and each MAC operation references the output variable, elements of a first tensor, and one or more elements of a second tensor. The method includes determining groups of the plurality of MAC operations by the computer processor. The MAC operations in each group reference a same output variable and have overlapping references to elements of the first tensor. The method further includes generating by the computer processor for each group of MAC operations, at least one instruction that loads a plurality of elements of the first tensor into a first register and at least one instruction that loads one or more elements of the second tensor into a second register. The method includes generating by the computer processor for each group of MAC operations, a second plurality of instructions that select for each MAC operation in the group for input to an array of MAC circuits, a plurality of elements from the first register and one or more elements from the second register.

A disclosed system includes a processor arrangement and a memory arrangement coupled to the processor arrangement. The memory arrangement is configured with instructions that when executed cause the processor arrangement to perform operations including inputting a first plurality of statements. Each statement specifies an output variable, an initial variable, and a plurality of multiply-and-accumulate (MAC) operations, and each MAC operation references the output variable, elements of a first tensor, and one or more elements of a second tensor. The operations include determining groups of the plurality of MAC operations. The MAC operations in each group reference a same output variable and have overlapping references to elements of the first tensor. The operations further include generating for each group of MAC operations, at least one instruction that loads a plurality of elements of the first tensor into a first register and at least one instruction that loads one or more elements of the second tensor into a second register. Additional operations include generating for each group of MAC operations, a second plurality of instructions that select for each MAC operation in the group for input to an array of MAC circuits, a plurality of elements from the first register and one or more elements from the second register.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 3 shows an example of a pseudo-code description of a high-level language (HLL) specification of a convolution of an input feature map;

FIG. 4 shows triplets produced by pre-processing the HLL convolution specification of FIG. 3;

FIG. 5 shows non-optimized intermediate program code generated from a statement/triplet of the exemplary specification of triplets of FIG. 4;

FIG. 6 shows an example of a fused statement generated by the convolution optimizer from the exemplary triplets of FIG. 4;

FIG. 7 is a flowchart of an exemplary process of analyzing reuse of vector loads and fusing loads for groups of MAC operations of a fused statement;

FIG. 8 shows a graph generated from the exemplary fused statement of FIG. 6;

FIG. 9 shows an exemplary specification of fused loads based on the example shown in FIGS. 6 and 8;

FIG. 10 shows an exemplary process of fusing multiple scalar loads into a single, larger load of scalar elements into the kernel vector register, which allows selection and routing of scalar elements through the permute network for input to MAC circuits of the MAC array;

FIG. 11 shows an exemplary specification of fused vector loads and fused scalar loads, continuing the example of FIG. 9;

FIG. 15 illustrates the VLIW-directed operations associated with the fused MAC operations according to the example of FIGS. 12 and 14;

DETAILED DESCRIPTION

Figure 1:
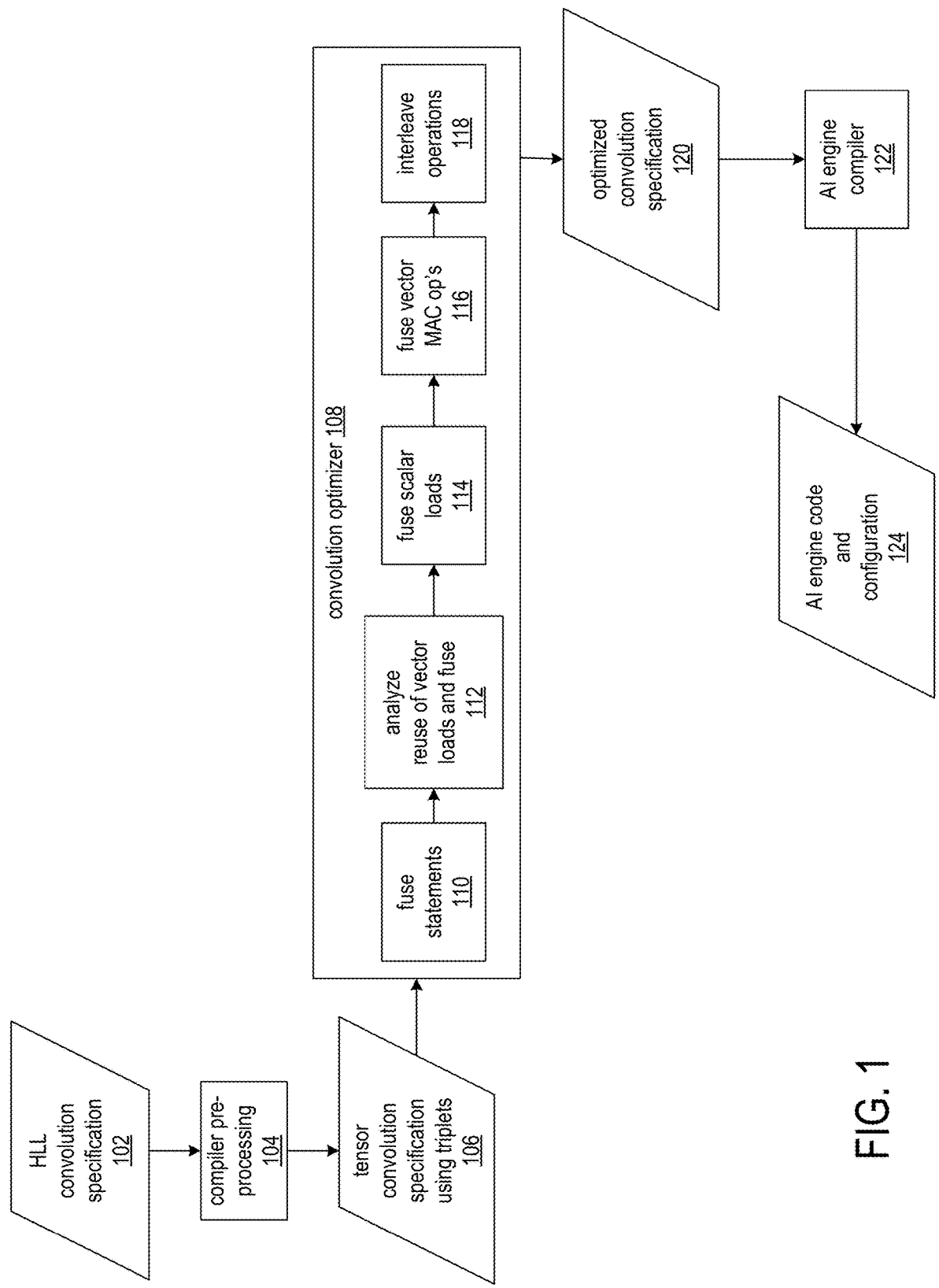
FIG. 1 is a flow diagram that illustrates compilation of convolution program code into instructions optimized for a processor (an AI engine) having an array of multiply-and-accumulate circuits.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

This disclosure describes new techniques for compiling vectorized program code containing arbitrary length vectors into optimized code using fixed-length vectors and efficiently implementing convolutions and other linear algebraic operations on an AI engine. The disclosed techniques employ novel analyses and transformations to produce efficient convolution kernels from a high level language (HLL) description, without requiring programmers to program with intrinsic functions of the AI engine. The disclosed techniques also generate program code that takes advantage of features of the target AI engine, such as a VLIW instruction word, 2D vector multiplier array, and permute unit. The generated program code also compensates for features not found in the target AI engine but found in other vector processors, such as unaligned vector loads and gather operations.

FIG. 1 is a flow diagram that illustrates compilation of convolution program code into instructions optimized for a processor (an AI engine) having an array of multiply-and-accumulate circuits. The convolution optimizer 108 generates optimized convolution program code 120 based in intermediate program code 106 generated by a compiler preprocessor 104. In an exemplary implementation, the specification 120 can be a C-language representation of the convolution that uses intrinsic functions to represent vector operations. The AI engine compiler 122 compiles the specification 120 into binary code 124, which requires (among other things) bundling vector operations with other operations into VLIW instructions, scheduling those VLIW instructions to meet the detailed requirements of the architecture and encoding each VLIW instruction into binary form.

The compilation process begins with the input of a high-level language (HLL) specification 102 of convolution. For example, the HLL specification can be a C-language specification having nested for loops that convolve two tensors. The specification can be input to a compiler preprocessor 104, which generates an intermediate specification 106. In an exemplary implementation, the compiler preprocessor can be a Halide compiler, which produces triplets that specify MAC operations in the intermediate specification 106. In alternative implementations, the intermediate specification 106 can be the result of transforming loops in a C-code representation to expose vectorization opportunities, or the result of extracting loops from a control and data flow graph (CDFG) representation and a subsequent transformation that exposes vectorization opportunities.

Each triplet is a statement that specifies an output variable, an initial variable, and multiple MAC operations. Each MAC operation references an output variable, elements of a first tensor, and an element of a second tensor. The triplet specification of the element of the second tensor implies that the element (scalar) of the second tensor is "broadcast" into a vector and multiplied by the vector of elements selected from the first tensor. It will be recognized that a vector of independently selected elements from the second tensor could be multiplied by the vector of elements from the first tensor.

Block 110 of the convolution optimizer 110 fuses multiple related triplets into a fused statement. That is, triplets that specify the same output location and the same initial load can be grouped together and further analyzed for fusing of vector loads and scalar loads.

Block 112 of the convolution optimizer analyzes references by the MAC operations to elements of the first tensor and fuses multiple individual loads of elements into a single load operation. The single load operation reads tensor elements from memory into a vector register for use in multiple MAC operations. For example, multiple MAC operations of a fused statement can reference elements whose indices in the first tensor overlap. Instead of repeating the loading of some elements from memory for different MAC operations, a larger group of elements can be loaded into a vector register and selected when needed for the different MAC operations.

Block 114 of the convolution optimizer fuses individual loads of adjacent scalar values into a single load. For example, multiple MAC operations of a fused statement can reference sequentially stored elements of the second tensor. Instead of individually loading the scalar value and broadcasting the value into a vector register, multiple scalar values can be loaded into a vector register for distribution to elements of a MAC array. The convolution optimizer can designate related fused individual loads, fused scalar loads, and fused MAC operations by specifying associations between the data in intermediate data structures.

Block 116 of the convolution optimizer fuses MAC operations of a fused statement into groups of MAC operations. MAC operations can be fused into a group if the operands referenced by those MAC operations can all be present at once in a set of vector registers.

Block 118 of the convolution optimizer interleaves the fused load operations and fused MAC operations. That is, at block 118 the convolution optimizer generates a sequence of instructions from the fused load operations and fused MAC operations such that the instructions that specify each group of fused MAC operations are preceded by one or more instructions that specify the fused load operations. The ordering of the load instruction and MAC instructions is such that the load instructions read the tensor elements needed by fused MAC operations from memory into vector registers. In generating the instructions, each MAC instruction is specified with a portion that controls which part of each vector register is selected for input to the elements of the MAC array.

Figure 2:
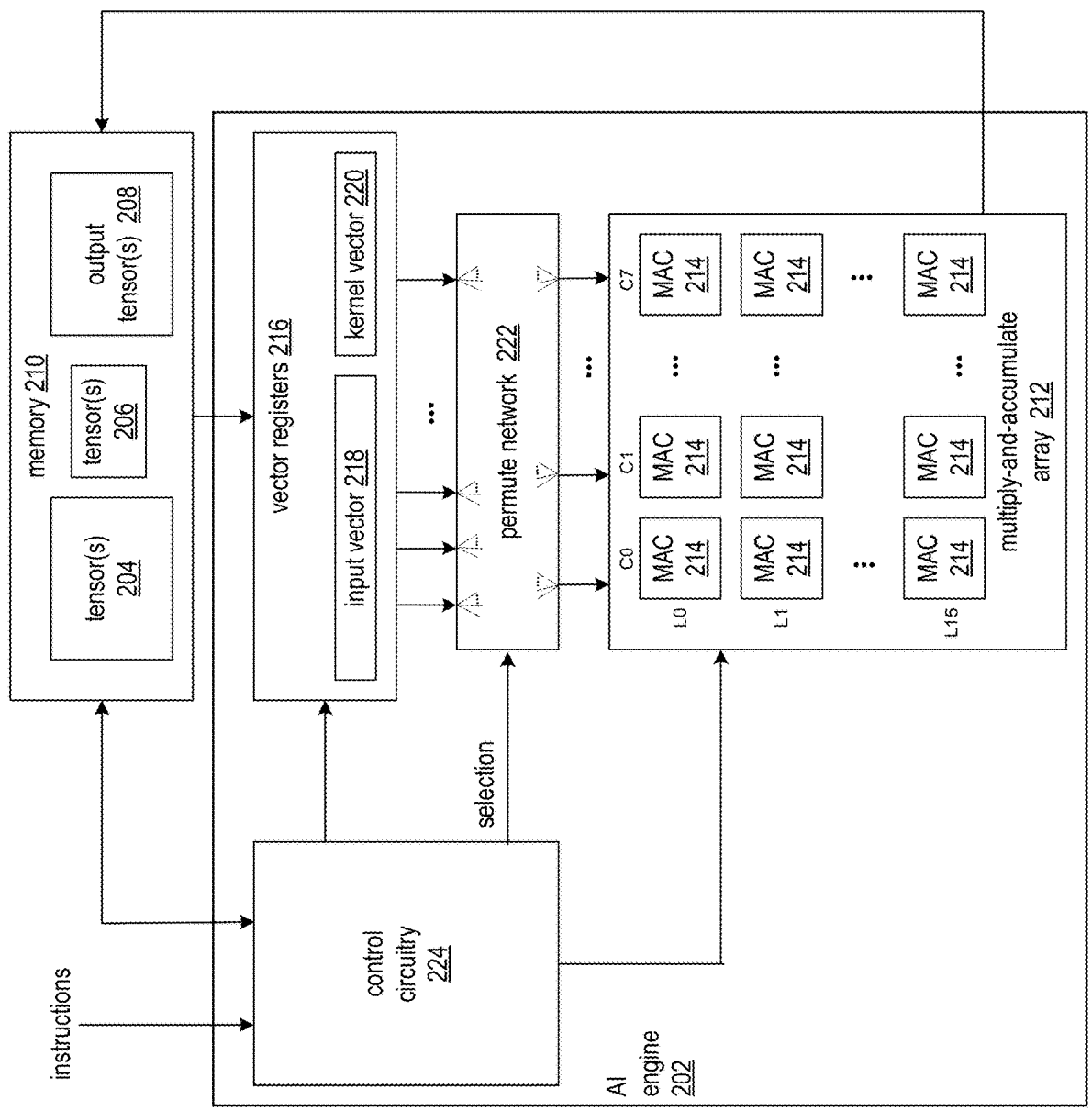
FIG. 2 shows a processor (or "AI engine") having a multiply-and-accumulate array.

FIG. 2 shows a processor (or "AI engine") 202 having a multiply-and-accumulate array 212. The multiply-and-accumulate (MAC) array has an array of MAC circuits 214. Each instance of the MAC circuit has circuitry that can multiply two input operands and accumulate the product with another input operand. The operands for multiplication can be provided as inputs from the permute network 222, and the input operand for accumulation can be provided as an initial value input from the permute network or as a partially accumulated value from an adjacent MAC circuit in the array.

The AI engine 202 has control circuitry 224 that inputs instructions and controls the MAC array 212, permute network 222, vector registers 216, and memory 210 in response to codes in the instructions. In an exemplary application, the sequence of instructions can direct convolution processing of one or more input tensors 204 with one or more tensors 206 in the memory 210. The results can be stored as one or more output tensors 208 in the memory.

In response to a load instruction, the control circuitry 224 reads tensor elements from input data sets and stores the elements in the vector registers 216. As a non-limiting example, elements of an input tensor can be stored as an input vector 218 in the vector registers, and elements of a convolution kernel can be stored as a kernel vector 220 in the vector registers. The control circuitry can load 128-bit or 256-bit long data from the memory 210 in the vector registers 216, for example.

In response to a MAC instruction, the control circuitry 224 controls the permute network 222 with selection signals to select elements from the vector registers 216 for input to instances of the MAC circuits 214. The permute network can be implemented by multiplexer logic between the vector registers and the MAC array 212. The permute network can be controlled to select, for example, 8-bit, 16-bit, or 32-bit values from the vector registers for input to the MAC circuits. The control circuitry can control the permute network to select for each instance of the MAC circuit, data values from different positions in the vector registers. The control circuitry signals the instances of the MAC circuit when inputs are valid and MAC operations can commence.

The AI engine 202 can reach peak efficiency when multiple terms are accumulated together in one cycle, and the pseudo-code in Example 1 shows nested loops that can be compiled into an instruction that the AI engine can compute in one cycle In the example, 128 different values of B can be held in a 1024-bit register (i.e., one of the vector registers 216) and multiplied by 8 values in another of the vector registers to produce 16 values in the output register (not shown).

For (int i=0; i<16; i++)//independent lanes
   For (int j=0; j<8; j++) {//accumulated terms
      A[i]+=B[8*i+j]*C[j]

Example 1

To generate instructions for the AI engine that fully exploits this capability and achieves optimal efficiency, the convolution optimizer 108 (FIG. 1) finds code that can be reordered into a suitable form. Notably, some single instruction multiple data (SIMD) architectures implement independent vector lanes, but do not support accumulation of vector terms within a single cycle.

The convolution optimizer can generate instructions that enable non-uniform strides of elements within the vector registers 216 and replication of an element within the vector registers to multiple instances of the MAC circuit 214. The pseudo-code in Example 2 illustrates a convolution from which an instruction can be generated to implement a non-uniform stride.

For (int j=0; j<8; j++) {
  For (int k=0; k<2; k++) {
    For (int i=0; i<2; i++)
      A[8k+]=B[8k+i]*C[j]//accesses B=0, 1, 8, 9
    For (int i=0; <2; i++)
      A[8k+i+2]=B[8k+i+2]*C[j]//accesses B=2, 3, 10, 11
    For (int i=0; <2; i++)
      A[8k+i+4]=B[8k+i+4]*C[j]//accesses B=4, 5, 12, 13
    For (int i=0; <2; i++)
      A[8k+i+6]=B[8k+i+6]*C[j]//accesses B=6, 7, 14, 15
  }
}

Example 2

The accesses to B in each of the innermost For-loops in Example 2 result in non-uniform strides. The accesses to B in the statement:

$$A[8k+i]=B[8k+i]*C[j]$$

index B[0], B[1], B[8], B[9]. The stride is considered non-uniform because the differences sequential index values are not equal. In the example, the difference between indices in B[0] and B[1] is 1, and the difference between indices in B[1] and B[8] is 7. A single MAC instruction, executed in one cycle can implement all the MAC operations in Example 2.

FIGS. 3, 4, and 5 illustrate an example in which an HLL convolution specification is transformed into intermediate code for an AI engine without application of the inventive optimization techniques disclosed herein. FIG. 3 shows an example of a pseudo-code description of a high-level language (HLL) specification 302 of a convolution of an input feature map. The input feature map, I, has X columns and Y rows, and the kernel, W, has S columns and R rows. The output feature map is "O."

FIG. 4 shows triplets 304 produced by pre-processing the HLL convolution specification of FIG. 3. The exemplary triplets are based on r ranging from 0 to 2 and s ranging from 0 to 2. The 9 statements (numbered S0 through S8 are an unrolling of the R and S loops for 8 different values of the X loop (the 8 vector locations 0:7 of the O array) and a single value of Y (Y=0). The triplets are referenced as statements numbered S0-S8. The output portion of each triplet references indices in the output feature map to be updated by the MAC operations of the triplet. The initial load portion of each triplet references indices in the output feature map to be accumulated with the products of the MAC operations. The MAC operations of each triplet reference operands from the input feature map and kernel. In the example, the MAC operations of each triplet reference multiple operands from a row of the input feature map, and one element of the kernel. For example, I[0][0:7]*W[0] specifies multiplication of each of elements in columns 0 through 7 in row 0 of the input feature map by element 0 of the kernel, and an implied accumulation of those products with the current value in the output feature map at row 0, columns 0 to 7, respectively.

FIG. 5 shows non-optimized intermediate program code 306 generated from statement/triplet 0 of the exemplary specification of triplets of FIG. 4. Additional intermediate program code (not shown) would be generated to cover statements/triplets 1 through 8.

Vector load statements are generated for vectors V1, V2, and V3. Elements of the input feature map indexed at columns 0 to 7 of row 0 (row 0 is implied by the label "S0:") are loaded into V1, one element of the kernel referenced at 0:0 is "broadcast" (stored in multiple locations) to V2, and elements of output feature map indexed at columns 0 to 7 are loaded into V3.

Vectors V2 and V3 are multiplied and accumulated, and the results are stored in vector V4. The results in vector V4 are added to the current results in the vector V3 and stored in vector V5. The results in vector V5 are stored back to the output feature map O.

Compilation of the exemplary intermediate code 306 may be inefficient and problematic for some target AI engines. For example, some AI engines may not support unaligned loads. That is, for statement S1, generated code would include the statement VLOAD(I,1:8), which is not shown in the example. However, elements 1:8 may not be aligned with address boundaries, and compiled code might split computation specified by the triplet into two cycles of the MAC array, resulting in repeated loading of the same elements for multiple statements. In addition, the target AI engine may lack a broadcast capability. Some AI engines do not support a broadcast load that entails a scalar load from a memory location and replication of the scalar value in a vector register. Instead of working around the limitation by performing a scalar load of one element and configuring the permute unit to broadcast the element into a separate vector register, the disclosed approaches avoid a separate scalar load, which increases register reuse and reduces memory operations, and fuse the permute operation with the following MAC operation.

The statements S0 through S8 all store MAC results back to the same location, as exemplified by the statement, VSTORE(0,0:7,V5), in the intermediate code 306. Storing intermediate results of the convolution for each statement to the same locations can be inefficient.

The disclosed techniques avoid the inefficiencies in the generated intermediate code as produced by prior approaches. FIGS. 6-17 illustrate operation of the convolution optimizer 108 (FIG. 1) on the example triplets of statements 0 through 8 in FIG. 4.

FIG. 6 shows an example of a fused statement generated by the convolution optimizer (FIG. 1, block 110) from the exemplary triplets of FIG. 4 according to the disclosed approaches. The triplets/statements S0 through S8 of FIG. 4 are fused into a single statement FS0 in FIG. 6. The convolution optimizer determines from the specification of the triplets that statements 0 through 8 store results to the same locations (0[0][0:7]) and load initial values from the same locations (0[0][0:7]). As the triplets store results to the same locations and load initial values from the same locations, the convolution optimizer determines that the triplets representing statements S0 through S8 can be fused into a single statement. The fused statement is identified as statement FS0, and the output specification, initial load specification, and group of MAC operations of the triplets are associated with the statement number/identifier. The convolution optimizer can analyze all input triplets and generate additional fused statements based on shared output locations and shared initial loads as explained above.

FIG. 7 is a flowchart of an exemplary process of analyzing reuse of vector loads and fusing loads for groups of MAC operations of a fused statement. The multiple tensor elements loaded into a vector register may also be referred to herein as an individual group. The process of FIG. 7 expands the processing of block 112 (FIG. 1) of the convolution optimizer. At block 352, the convolution optimizer builds a graph of vector load specifications for the MAC operations in a fused statement. FIG. 8 shows a graph 370 generated from the exemplary fused statement of FIG. 6, along with fused loads 372 determined and generated from the graph.

Each vertex in the graph represents a vector load specification of references to elements of an input tensor (e.g., input feature map) by a MAC operation in the fused statement. Each edge between two vertices represents overlapping references to elements of the input tensor by MAC operations represented by the two vertices. Each load can be represented by an expression: (base+i*stride, for i in 0 . . . n−1), where n is the size of the vector; base and stride are parameters of the load. For example, if base=16, stride=2, and n=4, then a vector will be formed from memory addresses 16, 18, 20, and 22.

In an alternative approach, a bipartite graph could have edges between vertices to represent a data vector requirement to a legal load that can partially satisfy that requirement. The bipartite graph can also convey data dependence information for determining operation scheduling.

At block 354, the convolution optimizer determines references to elements that are shared between the vector loads. For example, vertex 376 in FIG. 8 references elements in columns 0:7 of row 0, and vertex 378 references elements in columns 1:8 of row 0. The shared references are to elements 1:7. Weights are associated with edges to indicate the number of references shared between two loads. The number of elements that both vector loads reference is 7 (elements 1:7).

At block 356, the convolution optimizer determines supersets of vector elements that cover the references specified in strongly connected vertices of the graph. For example, vertices 376, 378, and 380 are strongly connected, and the superset of references is 0:9 in row 0. Similarly, the superset of references of the strongly connected vertices 382, 384, and 386 is 0:9 in row 1, and the superset of references of the strongly connected vertices 388, 390, and 392 is 0:9 in row 2.

With the superset of references determined, the convolution optimizer can determine the number of elements to load into the vector register based on the total number of elements referenced, the size of the vector register, and the size of each element. Each set of strongly connected vertices in the graph represents data vector requirements that can be realized using the same (possibly arbitrarily long) dense vector load. The long vector load can be expressed as min+i, for i in 0 . . . n−1, where min is the smallest address of all the loads, and min+i is the largest address of all the loads. The idea is that all of the addresses needed by all the loads are covered by the dense vector load. If there are two loads with (base0, stride0, n0) and (base1, stride1, n1), then min=minimum(base0, base1), max=maximum(base0+(n0−1)*stride, base1+(n1−1)*stride), i=maximum−minimum.

The dense vector load is aligned to ensure that the load starts and ends on a vector boundary, which is an address that is aligned with an architecture-specific minimum memory alignment granularity (e.g. 16-bytes). The alignment of the dense vector load results in an expression: start+i for i in 0 . . . m−1, where start is a memory address, m is the number of elements in the new aligned load, start and m are divisible by the vector length, start <=min and min+ n<=start+m). For some AI engines, m may be too large to be processed in one cycle by the MAC array. In situations in which m is too large, the vector can be partitioned into multiple non-overlapping dense vector loads, each of the form: start+i for i in 0 . . . L−1, where L is the size of a vector register.

The elements to load for the sets of strongly connected vertices are illustrated as groups G1, G2, and G3 in FIG. 8. In the example, with 16-bit data values the minimum number of elements that can be read from the memory is 8, and the vector register can accommodate 16 elements. Thus, group G1 loads elements 0:15 of row 0, which covers the superset of references to elements 0:9 in row 0 by strongly connected vertices 376, 378, and 380. Similarly, group G2 loads elements 0:15 of row 1, and group G3 loads elements 0:15 of row 2.

At block 358, the convolution optimizer determines permute coefficients for each group of references and fuses the vector loads. The permute coefficients specify control of the permute network 222 (FIG. 2) for selecting values from the vector registers 216 and distributing the values to the desired instances of the MAC circuits in the MAC array. A fused vector load specifies an address, a length, and the target vector register. The permute coefficients are associated with the fused vector load in order to generate vector computation instruction (e.g., MUL or MAC) that specify a vector register and control signals for controlling the permute unit. Each abstract operation on input data is implemented as a combination of at least a vector load instruction and a vector compute instruction.

FIG. 9 shows an exemplary specification of fused loads based on the example shown in FIGS. 6 and 8. The exemplary specification of the fused statement 308 shown in FIG. 6 is supplemented in FIG. 9 with select statements and group indicators. The fused vector loads are exemplified in the example specification 402 of FIG. 9 by the group designations G1, G2, and G3, and the permute coefficients are exemplified by the select statements. G1 indicates a fused vector load of elements 0:15 of row 0, G2 indicates a fused vector load of elements 0:15 of row 1, and G3 indicates a fused vector load of elements 0:15 of row 2. Each select statement signifies the permute coefficients to be generated to extract 8 consecutive elements to be operated on by the MAC array. For example, "select (G2,2:9)" indicates that elements should be read from locations 2:9 of the input vector 218 (FIG. 2) and routed to selected instances of the MAC circuits 214 of the MAC array. The permute coefficients can be indicated by codes (not shown) associated with the select statements in intermediate data structures having data used to generate the load and vector computation instructions.

FIG. 10 shows an exemplary process of fusing multiple scalar loads into a single, larger load of scalar elements into a vector register, which allows selection and routing of scalar elements through the permute network for input to MAC circuits of the MAC array. The multiple scalar elements loaded into a vector register may also be referred to herein as a scalar group. The process of FIG. 10 further describes the processing of block 114 (FIG. 1) of the convolution optimizer 108.

At block 452, the convolution optimizer determines scalar loads that can be grouped together by identifying scalar loads that reference adjacent elements in the input kernel. Continuing with the example shown in FIG. 9, the kernel loads are indicated by the following references: W[0:0], W[1:1], . . . , W[8:8].

At block 454, the convolution optimizer combines the scalar loads determined to reference adjacent kernel elements into groups, and determines permute coefficients for the permute network. Each group corresponds to a fused scalar load. A fused scalar load specifies loading multiple elements from the kernel, and the number of elements depends on the size of kernel element and the size of the kernel vector register. Intermediate data structures can be used to store data, which is used to generate the load and vector computation instructions, indicating associations between grouped vector loads ("fused vector loads"), grouped scalar loads ("fused scalar loads"), the permute coefficients, and the vector computations.

FIG. 11 shows an exemplary specification 460 of fused vector loads and fused scalar loads, continuing the example of FIG. 9. The exemplary specification of the fused vector loads shown in FIG. 9 is supplemented in FIG. 11 with select statements and group indicators for the scalar loads. The fused scalar loads are exemplified in the example specification 460 by the group designations G4 and G5, and the permute coefficients are exemplified by the select statements. G4 indicates a fused scalar load of elements 0:7 of the kernel, and G5 indicates a fused scalar load of element 8 of the kernel. Each select function signifies the permute coefficients to be generated to select the kernel element from the kernel vector register and route the value to a MAC circuit instance of the MAC array. In the example, a 3×3 kernel has 9 elements, and the elements are stored in adjacent memory locations W[0:8]. During scalar load fusing (FIG. 1, 114), two vector registers are used. One of the vector registers stores W[0:7] (represented by G4), and the second vector register stores W[8:15] (represented by G5). As W[8:8] is stored in the first position in the second vector register, the select statement for group G5 references the first position (0:0).

Figure 12:
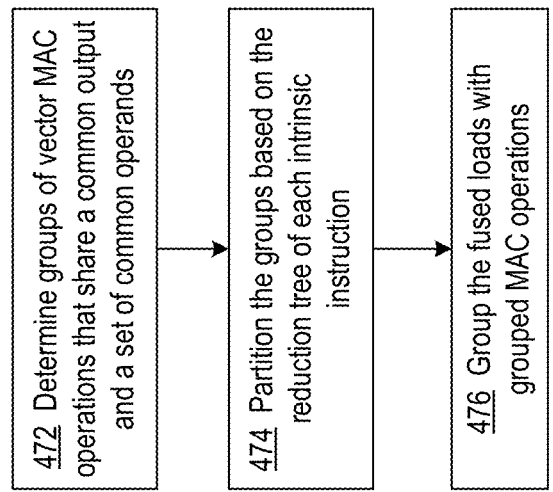
FIG. 12 shows a flowchart of an exemplary process that fuses vector MAC operations of a fused statement.

FIG. 12 shows a flowchart of an exemplary process that fuses vector MAC operations of a fused statement consistent with block 116 of the convolution optimizer 108 of FIG. 1. The convolution optimizer fuses MAC operations of a fused statement into groups of MAC operations. MAC operations can be fused into a group if the operands referenced by those MAC operations can all be present in the vector registers 216 when needed to perform the MAC operations.

At block 472, the convolution optimizer determines groups of MAC operations that share outputs and sets of operands. For example, in the fused statement shown in FIG. 11, the statement specifies the following MAC operations: select(G1,0:7)*select(G4,0:0); select(G1,1:8)*select(G4,1:1); and select(G1,2:9)*select(G4,2:2). The three vector MAC operations can be fused, because all three operations output to 0[0][0:7], all three operations take the first operand from the fused vector load indicated by G1, and all three operations take the second operand from the fused scalar load indicated by G4.

In determining groups of vector MAC operations, operation intrinsics are generated, and the generated intrinsics include not only multiplication but also an addition. The addition operation is a "reduction," because, for example, a 16-element vector is produced by 32 multiplications. The AI engine allows increasing the number of multiply operations without increasing the width of the load/store paths to memory. The example might begin with 2 multiply operations (e.g., $e=a*b$ and $f=c*d$). To fully utilize the hardware capabilities, another operation, for example, $g=e+f$, can be identified and allow mappings of: a→z00, b→x00, c→z01, d→x01, g→acc0, where z00, x00, z01, x011, and acc0 refer to registers and positions of the variable within the registers. The mappings ensure that a and c are loaded from the same vector load and b and d are loaded from the same vector load.

At block 474, the convolution optimizer partitions the groups based on the reduction tree of each intrinsic instruction. That is, the operations are partitioned into separate instruction intrinsics, because the addition intrinsic is limited to the results from two multiplication intrinsics. In an exemplary approach, the first partition is specified to include a multiplication intrinsic, and the following partitions specified to include MAC intrinsics. At block 476, the convolution optimizer groups the fused loads with the fused vector MAC operations.

Figures 13, 14:
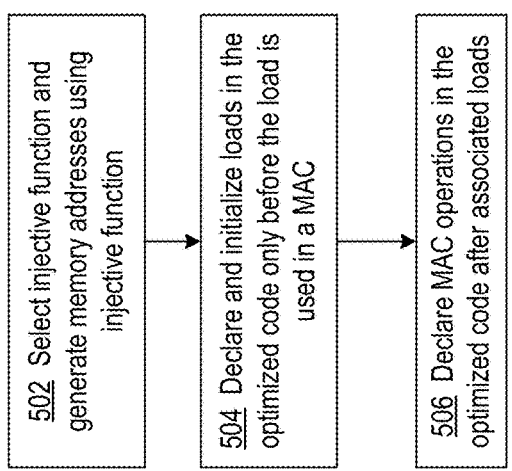
FIG. 13 shows a flowchart of an exemplary process that interleaves load and MAC operations.
FIG. 14 shows convolution program code generated from and consistent with the example of FIG. 11.

FIG. 13 shows a flowchart of an exemplary process that interleaves load and MAC operations consistent with block 118 of FIG. 1. The storage layout of each of the multi-dimensional matrices as addressed by the fused load operations is selected by the convolution optimizer rather than specified by the designer. At block 502, the convolution optimizer selects an injective mapping function that maps elements of the multi-dimensional tensor to unique linear memory addresses used by AI engine to load tensor elements values into vector registers. The injective function can be selected to ensure that the instructions controlling instances of the MAC circuit have optimal efficiency, and that the fused load instructions fetch data into vector registers is a minimized or minimal set. At blocks 504 and 506, the convolution optimizer declares the fused loads and fused MAC operations in the optimized code according to the fused loads grouped with the fused MAC operations. The order of statements shown in the example of FIG. 14 illustrate the declaration of the fused loads and fused MAC operations.

FIG. 14 shows convolution program code generated from and consistent with the example of FIG. 11. The specification 508 generally includes vector load statements and vector operation statements. The vectors are labeled Gx, the load operations are specified as VLOAD(tensor-ID, x:y), and vector operation statements include MULr and MACt.

One or more vector load statements immediately precede the vector operations that are associated with the one or more vector load statements. For example, the vector load statements for G1 and G4 are placed in the program code immediately preceding the vector operations MUL1, MAC2, and MAC3. MUL1, MAC2, and MAC3 input operands available in vectors G1 and G4. The load statement for G1 can specify loading the input vector 218 (FIG. 2), for example, and the load statement for G4 can specify loading the kernel vector 220.

The operands of G4 remain valid and can be reused for MAC4, MAC5, and MAC6, but MAC4, MAC5, and MAC6 require different operands in the input vector. Thus, a vector load statement is declared to load the operands of G2 into the vector registers prior to declaration of the MAC4, MAC5, and MAC6 statements.

The jump from 0:15 in the G1 load to 272:287 in the G2 load exemplifies the input I having been linearized, where address I[0] contains input[0][0], address I[272] contains input[1][0], such as in an application in which the input feature map is 272 pixels wide.

FIG. 15 illustrates the VLIW-directed operations of the MAC array 212 (FIG. 2) associated with the fused MAC operations according to the example of FIGS. 11 and 14. The fused vector MAC operation specified by select (G1,0:7) *select(G4, 0:0) are compiled into the MUL1 instruction, which as a VLIW that directs the instances of the MAC circuits in the MAC array to compute:

$$I_{0,0}*W_0 I_{0,1}*W_0 I_{0,2}*W_0 I_{0,3}*W_0 I_{0,4}*W_0 I_{0,5}*W_0 I_{0,6}*W_0 I_{0,7}*W_0$$

The MAC2 instruction can reuse the contents of the input vector and the kernel vector and the generated VLIW directs the instances of the MAC circuits in the MAC array to compute.

$$I_{0,1}*W_1 I_{0,2}*W_1 I_{0,3}*W_1 I_{0,4}*W_1 I_{0,5}*W_1 I_{0,6}*W_1 I_{0,7}*W_1 I_{0,8}*W_1$$

and accumulate the results of MAC2 with the results from MUL1, respectively.

Figure 16:
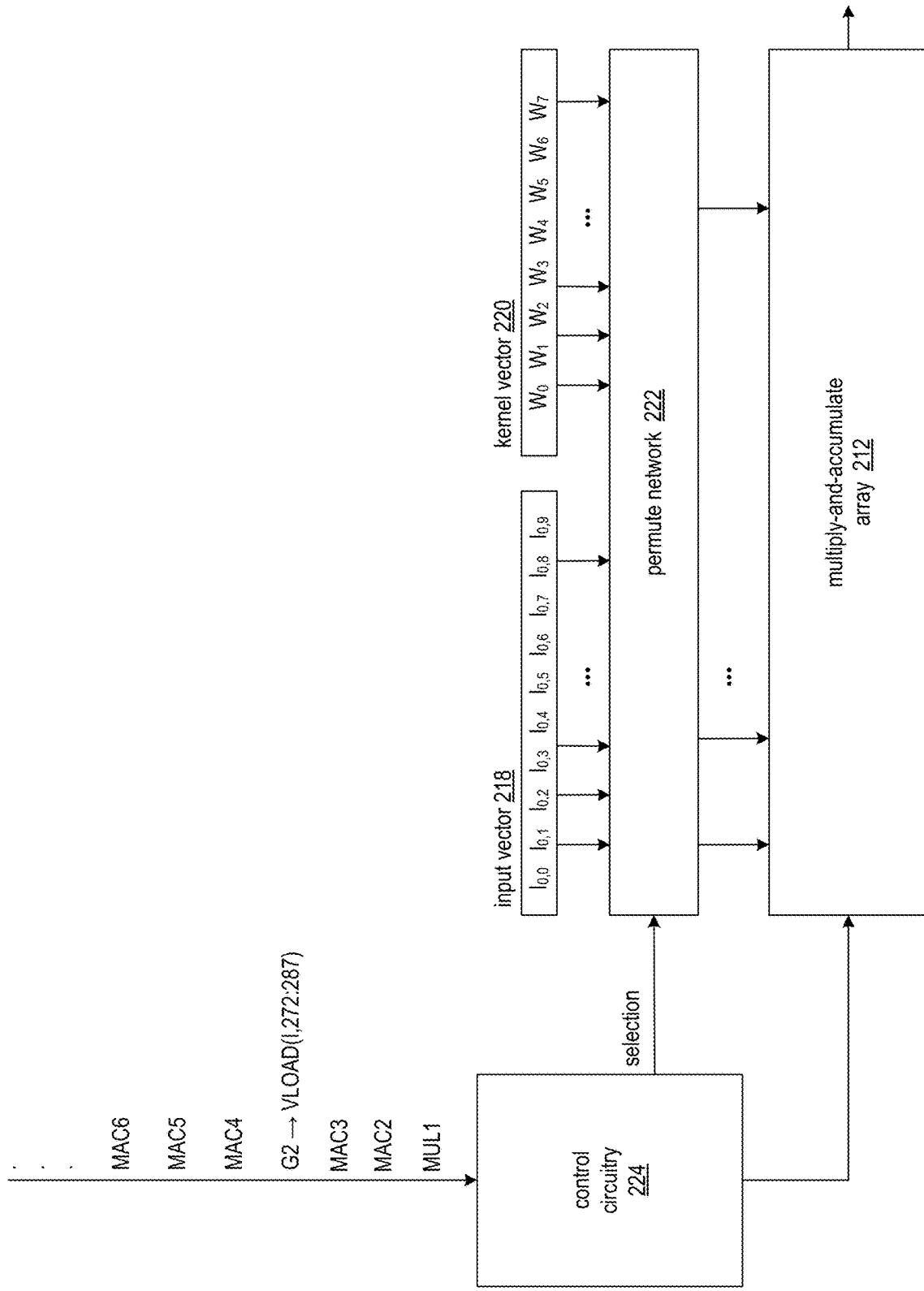
FIG. 16 illustrates the processor of FIG. 2 and the states of the vector registers having exemplary feature map elements and kernel elements after processing of the load instructions for vectors G1 and G4.

FIG. 16 illustrates the processor of FIG. 2 and the states of the vector registers having exemplary feature map elements and kernel elements after processing of the load instructions for vectors G1 and G4. The input vector 218 elements of the input tensor denoted as:

$$I_{0,0} I_{0,1} I_{0,2} I_{0,3} I_{0,4} I_{0,5} I_{0,6} I_{0,7} I_{0,8} I_{0,9}$$

The kernel vector 220 elements of the kernel denoted as:

$$W_0 W_1 W_2 W_3 W_4 W_5 W_6 W_7$$

The control circuitry 224 inputs a stream of instructions in the order (loading of G1 and G4 complete):

$$MUL1; MAC2; MAC3; G2\,VLOAD(I,272:278) MAC4; MAC5; MAC6;$$

The pseudo-code in Example 3 shows an example in which the techniques described for processing the example of FIG. 3 can be used by the convolution optimizer 108 to generate convolution specifications with non-uniform strides and/or fusion of MAC operations using a reduction tree.

```
For (int y = 0; y < yloop; y++) // input rows
  For (int x = 0; x < xloop; x++) // output rows
    For (int oc = 0; oc < 2; oc++)
      For (int ic = 0; ic < 4; ic++)
        For (int r = 0; r < 2; r++) // kernel pixels
          For (int s = 0; s < 2; s++) // kernel pixels
            O[oc][y][x] += W[oc][ic][s][r] * I[ic][y+s][x+r];
```

Example 3

The pseudo-code in Example 3 generates a greater dimension output than the example shown in FIG. 3. The greater dimension output is a result of the additional "oc" loop that accesses an additional dimension in the coefficient data and generates two independent output channels. The input data having greater dimensions is represented by the additional "ic" loop that accesses an additional dimension in the input and coefficient data and reduces the four contributions across each output channel in the "0" tensor.

A convolution optimizer 108 with the ability to produce code with non-linear strides across output channels can combine multiple loops to produce independent accumulator lanes. The convolution optimizer can tile the arbitrary length vectors of xloop into fixed length vector operations supported by the target AI engine. The pseudo-code in Example 4 shows an example in which the compiler optimizer can select a fixed vector length and split a loop into two independent loops to provide an equivalent implementation which combines coarse strides and fine offsets.

```
For (int oc = 0; oc < 2; oc++)
  For (int coarse_xloop = 0; coarse_xloop < xloop div 4;
  coarse_xloop++)
    For (int fine_xloop = 0; fine_xloop < 4; fine_xloop++)
      For (int y = 0; y < yloop; y++) // input rows
        For (int ic = 0; ic < 4; ic++)
          For (int r = 0; r < 2; r++) // kernel pixels
            For (int s = 0; s < 2; s++) // kernel pixels
              O[oc][y][4*coarse_xloop + fine_xloop] +=
              W[oc][ic][s][r] * I[ic][y+s][4*coarse_xloop +
              fine_xloop +r];
```

Example 4

The xloop in Example 4 that is split into coarse_xloop and fine_xloop in Example 5 is assumed to be a multiple of 4. However, the example can be generalized using techniques such as loop peeling.

In processing the triplets generated from HLL code corresponding to the pseudo-code of Example 4, the convolution optimizer 108 selects fixed loop bounds for the fine inner loop such that its multiplicative combination one or more other loop bound gives a scalar number less than or equal to the number of independent accumulator lanes. In the example, the selection of a fine_xloop having 4 iterations can be combined with the "ic" loop having 2 iterations to give 8 independent accumulator lanes. The convolution optimizer has knowledge of the variants supported by each AI engine architecture for each supported datatype. This example may target an instruction which may calculate 8 independent lanes with a parallel reduction over 4 independent input terms. Having made this decision, the convolution optimizer can interchange the loops to coalesce parallel operations in inner loops, which is illustrated by Example 5.

```
For (int y = 0; y < yloop; y++) // input rows processed sequentially
  For (int coarse_xloop = 0; coarse_xloop < xloop div 4; coarse_ xloop++)
    For (int r = 0; r < 2; r++) // kernel pixels processed sequentially
      For (int s = 0; s < 2; s++) // kernel pixels processed sequentially
        For (int oc = 0; oc < 2; oc++) // used for independent accumulators
          For (int fine_xloop = 0; fine_xloop < 4; fine_xloop++) // used for independent accumulators
            For (int ic = 0; ic < 4; ic++) // used for parallel reduction
              O[oc][y][4*coarse_xloop +fine_xloop] += W[oc][ic][s][r] *
I[ic][y]s][4*coarse_xloop + fine_xloop +r]
```

Example 5

The pseudo-code of Example 5 shows more than one loop variable used to select an accumulator, which is the target of a MAC instruction. Specifically, the "oc" and "fine_xloop" variables are used to select an accumulator. The convolution optimizer matches triplets generated from the innermost three loops to a single instruction that can execute in one cycle. The 32 fused MAC operations of that instruction are shown in FIG. 17.

Figure 17:
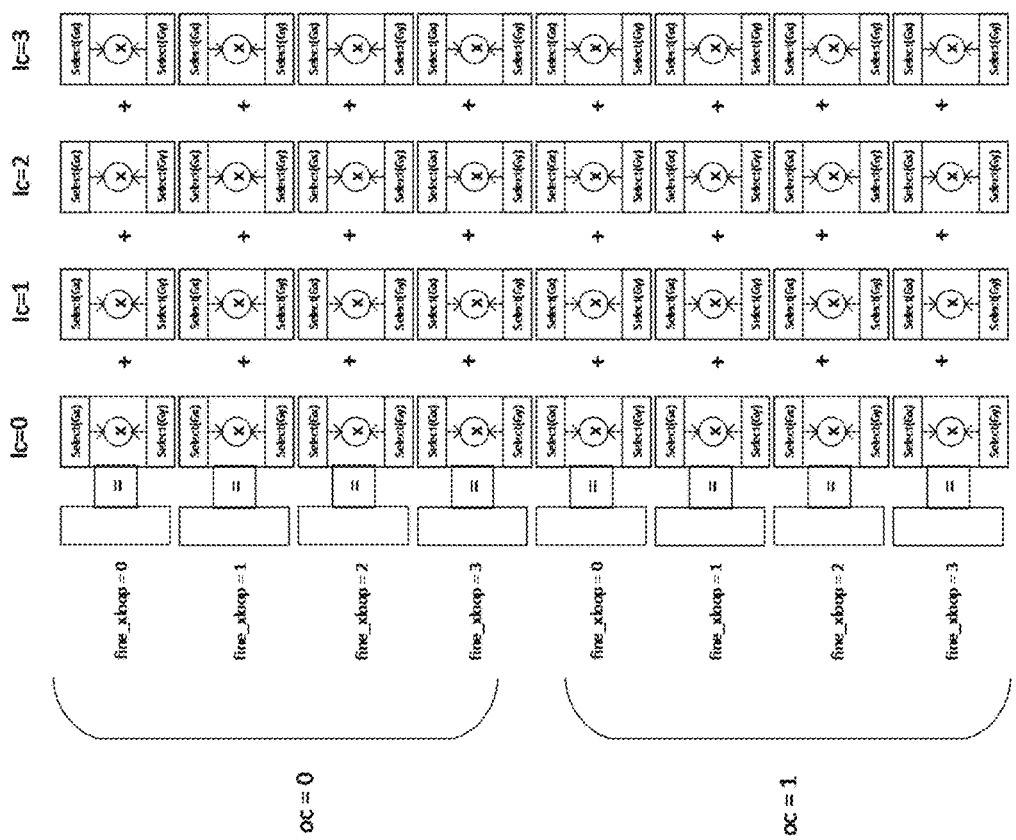
FIG. 17 shows the fusion of MAC operations of the innermost loops from Example 4 into a single instruction to the target AI engine.

FIG. 17 shows the fusion of MAC operations of the innermost loops from Example 5 into a single instruction to the target AI engine. Each MAC operation in the fused instruction selects data from one of two specified registers, Gx or Gy. The variable "oc" from the original code does not appear in the index expressions of the I input, so the data for the first four accumulators (oc=0, fine_xloop=0, 1, 2, 3) is identical to the data used for the second four accumulators (oc=1, fine_xloop=0, 1, 2, 3). This means that the Select(Gy) permute network may be programmed to feed only 16 unique values from the Gy register, reusing inputs fed into the top 16 MAC circuits of FIG. 17 as inputs to the bottom 16 MAC circuits. Therefore only 16 new values need be loaded into the Gy register every cycle to match the compute throughput.

The fine_xloop variable from the original code does not appear in the index expressions addressing the array W. This means that the Select(Gx) permute network need only select 8 unique values from the Gx register, replicating the same four values into the columns (ic=0:3) of each of the first four rows (where oc=1) and replicating the same four values into the columns (ic=0:3) of each of the second four rows (where oc=1). Therefore only 8 new values need be loaded into Gx register every cycle to match the compute throughput.

The input and weight selectors have a non-uniform stride across the 8 individual accumulators. The non-uniform stride can be seen by application of the transformation: I=4*oc+fine_xloop to explicitly represent the 8 accumulator lanes. Under this transformation, fine_xloop=I mod 4 and oc=I div 4, where "mod" is integer modulus and "div" is integer division. The example shows the indexes of the arrays each containing a non-linear expression.

```
For (int y = 0; y < yloop; y++) // input rows processed sequentially
  For (int coarse_xloop = 0; coarse_xloop < xloop div 4; coarse_xloop++)
    For (int r = 0; r < 2; r++) // kernel pixels processed sequentially
      For (int s = 0; s < 2; s++) // kernel pixels processed sequentially
        For (int I = 0 : 7) // used for independent accumulators, evaluated in parallel
          For (int ic = 0; ic < 4; ic++) // used for parallel reduction
            O[I div 4][y][4*coarse_xloop + I mod 4] += W[I div 4][ic][s][r] *
I[ic][y+s][4*coarse_xloop + I mod 4 + r]
```

Example 6

The pseudo-code of Example 6 shows explicit merging of the oc and fine_xloops leading to non-linear strides in the resulting I loop variable. An exemplary AI engine architecture implements an instruction set that supports encoding non-linear expressions and can efficiently select a minimal number of data elements from a register and replicate the selected data elements to different locations in the MAC array. MAC arrays lacking the capability to implement non-linear strides would require explicit replication of data elements in the Gx and Gy registers, which is an inefficient use of silicon area and energy. The schedule for the triplet specification derived from this example is shown in Table 1.

TABLE 1

| Statement | Output | Input | Weight |
|---|---|---|---|
| 0 | O[0:1][0][0:3] | I[0:3][0][0:3] | W[0:1][0:3][0:0] |
| 1 | O[0:1][0][0:3] | I[0:3][0][1:4] | W[0:1][0:3][1:1] |
| 2 | O[0:1][0][0:3] | I[0:3][0][2:5] | W[0:1][0:3][2:2] |
| 3 | O[0:1][0][0:3] | I[0:3][1][0:3] | W[0:1][0:3][3:3] |
| 4 | O[0:1][0][0:3] | I[0:3][1][1:4] | W[0:1][0:3][4:4] |
| 5 | O[0:1][0][0:3] | I[0:3][1][2:5] | W[0:1][0:3][5:5] |
| 6 | O[0:1][0][0:3] | I[0:3][2][0:3] | W[0:1][0:3][6:6] |
| 7 | O[0:1][0][0:3] | I[0:3][2][1:4] | W[0:1][0:3][7:7] |
| 8 | O[0:1][0][0:3] | I[0:3][2][2:5] | W[0:1][0:3][8:8] |

The triplet specification of Table 1 can be processed according to the algorithm of FIG. 7 to determine an optimized, fused set of register loads. The example contains both reductions and non-linear strides. Other examples containing reductions but not non-linear strides, or containing non-linear strides but not reductions are other useful applications of the disclosed processes.

Figure 18:
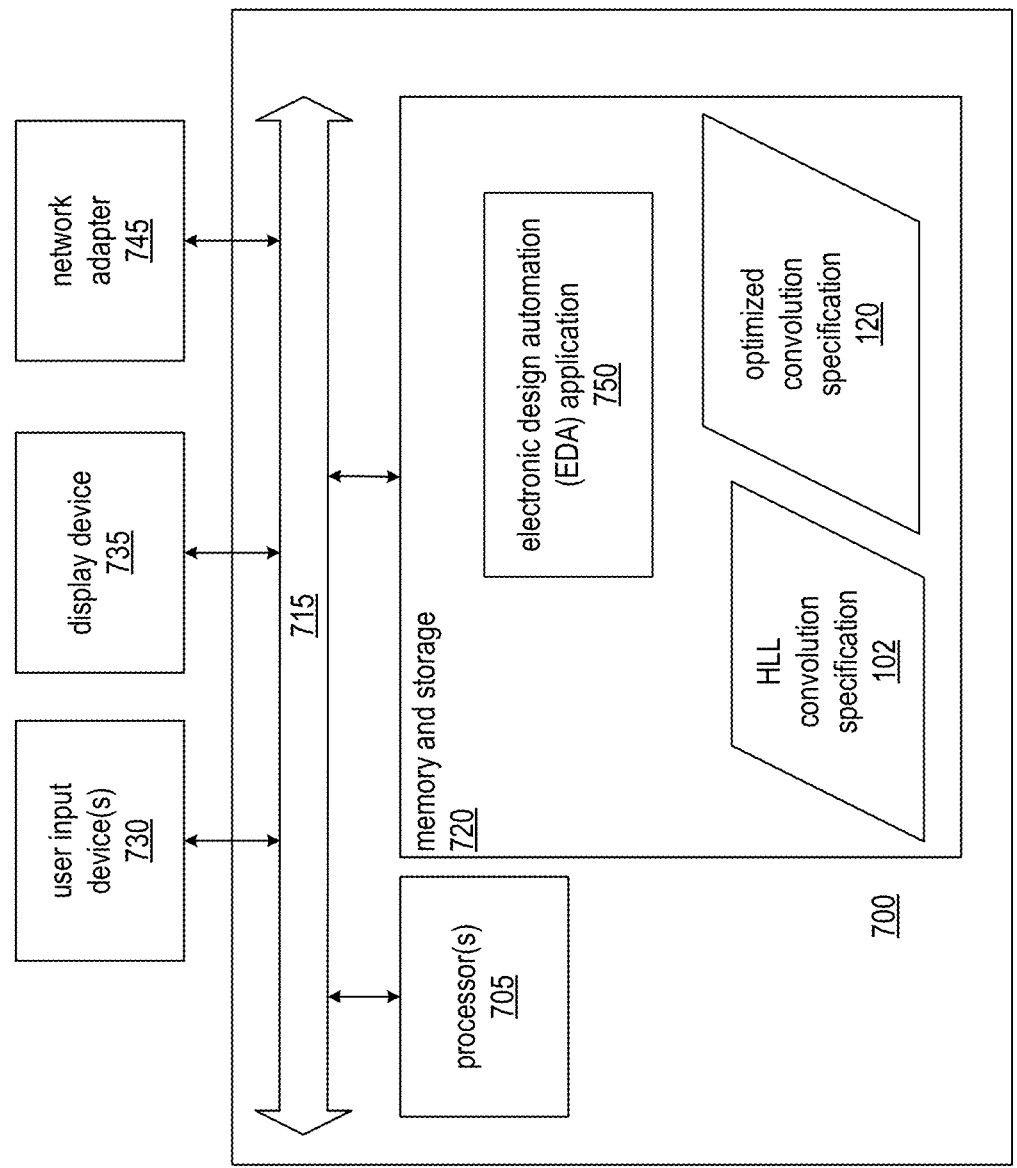
FIG. 18 is a block diagram illustrating an exemplary data processing system.

FIG. 18 is a block diagram illustrating an exemplary data processing system (system) 700. System 700 is an example of an EDA system. As pictured, system 700 includes a processor arrangement including one or more one processor circuits (also referred to as "computer processors" or "processors"), such as a computer central processing unit (CPU) 705, coupled to memory and storage arrangement 720 through a system bus 715 or other suitable circuitry. System 700 stores program code and HLL convolution specification 102 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on the HLL convolution specification 102. In one aspect, system 700 compiles the HLL convolution specification into an optimized convolution specification 120 and compiles the optimized convolution specification 120 into AI engine code 120 (FIG. 1).

EDA application 750, HLL convolution specification 102, optimized convolution specification 120, and any data items used, generated, and/or operated upon by EDA application 750 are functional data structures that impart functionality when employed as part of system 700 or when such elements, including derivations and/or modifications thereof, are loaded into an AI engine 202 (FIG. 2) creating an operable circuit.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for compiling program code for controlling an array of multiply-and-accumulate circuits. Other aspects and features will be apparent to those skilled in the art from consideration of the specification. It is intended that the specification and drawings be considered as examples only, with a true scope of the invention being indicated by the following claims.

What is claimed is:

1. A method comprising:
inputting by a computer processor a plurality of statements, wherein each statement specifies an output variable, an initial variable, and a plurality of multiply-and-accumulate (MAC) operations, and each MAC operation references the output variable, elements of a first tensor, and one or more elements of a second tensor;
determining groups of the plurality of MAC operations by the computer processor, wherein MAC operations in each group reference a same output variable and have overlapping references to elements of the first tensor;
generating by the computer processor for each group of MAC operations, at least one first instruction that loads a plurality of elements of the first tensor into a first register and at least one second instruction that loads one or more elements of the second tensor into a second register;
generating by the computer processor for each group of MAC operations, a plurality of instructions that select for each MAC operation in the group for input to an array of MAC circuits, a plurality of elements from the first register and one or more elements from the second register;
inputting the first instruction, the second instruction, and the plurality of instructions to a control circuit;
loading the plurality of elements of the first tensor into the first register and loading the one or more elements of the second tensor into the second register by the control circuit in response to the first and second instructions; and
selecting the plurality of elements from the first register and the one or more elements from the second register by the control circuit for input to the array of MAC circuits in response to the plurality of instructions.

2. The method of claim 1, wherein the determining groups includes:
combining two or more statements of the plurality of statements that have a same output variable and a same initial variable into a fused statement by the computer processor;
determining individual groups of the references to the elements of the first tensor by the computer processor based on overlapping index values in the references to elements of the first tensor in the fused statement;
determining scalar groups of the references to the one or more elements of the second tensor by the computer processor based on the references in the fused statement to adjacent elements of the second tensor; and
specifying associations between the individual groups, scalar groups, and MAC operations in the fused statement by the computer processor.

3. The method of claim 1, wherein for at least one MAC operation in a group of MAC operations, the plurality of elements selected from the first register by at least one instruction of the plurality of instructions, have a non-uniform stride.

4. The method of claim 3, wherein the plurality of MAC operations include two or more MAC operations that specify a reduction tree.

5. The method of claim 1, wherein the plurality of MAC operations include two or more MAC operations that specify a reduction tree.

6. The method of claim 1, further comprising:
selecting by the computer processor, an injective function that maps elements of the first tensor to unique linear memory addresses and that maps elements of the second tensor to unique linear memory addresses; and
wherein the generating of at least one instruction that loads a plurality of elements of the first tensor into a first register and at least one instruction that loads one or more elements of the second tensor into a second register includes, generating memory addresses of the plurality of elements of the first tensor and one or more memory addresses of the one or more elements of the second tensor using the injective function.

7. The method of claim 1, wherein the determining groups includes:
combining two or more statements of the plurality of statements that have a same output variable and a same initial variable into a fused statement by the computer processor;
determining individual groups of the references to the elements of the first tensor by the computer processor based on overlapping index values in the references to elements of the first tensor in the fused statement;
wherein the determining groups includes building by the computer processor, a graph of vector load specifications of the plurality of MAC operations, each vertex in the graph representing a vector load specification of references to elements of the first tensor by a MAC operation of the plurality of MAC operations, and each edge between two vertices in the graph representing overlapping references to elements of the first tensor by MAC operations represented by the two vertices;
determining scalar groups of the references to the one or more elements of the second tensor by the computer processor based on the references in the fused statement to adjacent elements of the second tensor; and
specifying associations between the individual groups, scalar groups, and MAC operations in the fused statement by the computer processor.

8. The method of claim 7, wherein the generating at least one instruction that loads a plurality of elements of the first tensor into the first register includes determining a total number of elements of the first tensor referenced by vector load specifications of vertices of strongly connected vertices in the graph.

9. The method of claim 8, wherein the generating at least one instruction that loads a plurality of elements of the first tensor into the first register includes determining the plurality of elements of the first tensor to load by the at least one instruction based on a size of the first register and a size of each element of the first tensor.

10. The method of claim 1, wherein the generating the plurality of instructions includes determining controls for multiplexer circuitry that selects tensor elements from the first register for input to the MAC circuits of the MAC array.

11. The method of claim 10, wherein the generating the plurality of instructions includes determining controls for the multiplexer circuitry that selects the one or more tensor elements from the second register for input to the MAC circuits of the MAC array.

12. A system comprising:
a processor arrangement; and
a memory arrangement coupled to the processor arrangement, wherein the memory arrangement is configured with instructions that when executed cause the processor arrangement to perform operations including:
inputting a plurality of statements, wherein each statement specifies an output variable, an initial variable, and a plurality of multiply-and-accumulate (MAC) operations, and each MAC operation references the output variable, elements of a first tensor, and one or more elements of a second tensor;

determining groups of the plurality of MAC operations, wherein MAC operations in each group reference a same output variable and have overlapping references to elements of the first tensor;

generating for each group of MAC operations, at least one instruction that loads a plurality of elements of the first tensor into a first register and at least one instruction that loads one or more elements of the second tensor into a second register;

generating for each group of MAC operations, a plurality of instructions that select for each MAC operation in the group for input to an array of MAC circuits, a plurality of elements from the first register and one or more elements from the second register;

inputting the first instruction and the second instruction to a control circuit;

loading the plurality of elements of the first tensor into the first register and loading the one or more elements of the second tensor into the second register by the control circuit; and selecting the plurality of elements from the first register and the one or more elements from the second register by the control circuit for input to the array of MAC circuits in response to the plurality of instructions.

13. The system of claim 12, wherein the instructions for determining groups include instructions that when executed by the processor arrangement cause the processor arrangement to:

combine two or more statements of the plurality of statements that have a same output variable and a same initial variable into a fused statement;

determine individual groups of the references to the elements of the first tensor based on overlapping index values in the references to elements of the first tensor in the fused statement;

determine scalar groups of the references to the one or more elements of the second tensor based on the references in the fused statement to adjacent elements of the second tensor; and specify associations between the individual groups, scalar groups, and MAC operations in the fused statement.

14. The system of claim 12, wherein for at least one MAC operation in a group of MAC operations, the plurality of elements selected from the first register by at least one instruction of the plurality of instructions, have a non-uniform stride.

15. The system of claim 14, wherein the plurality of MAC operations include two or more MAC operations that specify a reduction tree.

16. The system of claim 12, wherein the plurality of MAC operations include two or more MAC operations that specify a reduction tree.

17. The system of claim 12, wherein the memory arrangement is further configured with instructions that when executed cause the processor arrangement to perform operations including:

selecting, an injective function that maps elements of the first tensor to unique linear memory addresses and that maps elements of the second tensor to unique linear memory addresses; and wherein the instructions for generating of at least one instruction that loads a plurality of elements of the first tensor into a first register and at least one instruction that loads one or more elements of the second tensor into a second register include, instructions for generating memory addresses of the plurality of elements of the first tensor and one or more memory addresses of the one or more elements of the second tensor using the injective function.

18. The system of claim 12, wherein the instructions for determining groups include instructions that when executed cause the processor arrangement to perform operations including:

combining two or more statements of the plurality of statements that have a same output variable and a same initial variable into a fused statement;

determining individual groups of the references to the elements of the first tensor based on overlapping index values in the references to elements of the first tensor in the fused statement;

wherein the instructions for determining groups include instructions for building, a graph of vector load specifications of the plurality of MAC operations, each vertex in the graph representing a vector load specification of references to elements of the first tensor by a MAC operation of the plurality of MAC operations, and each edge between two vertices in the graph representing overlapping references to elements of the first tensor by MAC operations represented by the two vertices;

determining scalar groups of the references to the one or more elements of the second tensor based on the references in the fused statement to adjacent elements of the second tensor; and specifying associations between the individual groups, scalar groups, and MAC operations in the fused statement.

19. The system of claim 18, wherein the instructions for generating at least one instruction that loads a plurality of elements of the first tensor into the first register include instructions that when executed cause the processor arrangement to determine the plurality of elements of the first tensor to load by the at least one instruction based on a size of the first register and a size of each element of the first tensor.

20. The system of claim 12, wherein:

the instructions for generating the plurality of instructions include instructions that when executed cause the processor arrangement to determine controls for multiplexer circuitry that selects tensor elements from the first register for input to the MAC circuits of the MAC array; and the instructions for generating the plurality of instructions include instructions that when executed cause the processor arrangement to determine controls for the multiplexer circuitry that selects the one or more tensor elements from the second register for input to the MAC circuits of the MAC array.

* * * * *